United States Patent [19]

Burreson et al.

[11] Patent Number: 4,882,174

[45] Date of Patent: Nov. 21, 1989

[54] ARTIFICIALLY EXTENDED NATURAL SEAFOOD BAIT AND METHOD OF MAKING THE SAME

[76] Inventors: Jay B. Burreson, 1664 N.W. Midlake La., Beaverton, Oreg. 97005; William B. Neels, 4481 S.E. Concord Rd., Milwaukie, Oreg. 97222; Theodore G. Plew, 8351 N.E. Union Ave., Portland, Oreg. 97211; James H. Borger, 13260 N.W. Overton St., Portland, Oreg. 97229

[21] Appl. No.: 79,203

[22] Filed: Jul. 28, 1987

Related U.S. Application Data

[63] Continuation-in-part of Ser. No. 852,083, Apr. 14, 1986, abandoned, and a continuation of Ser. No. 707,421, Mar. 1, 1985, abandoned, and a continuation-in-part of Ser. No. 521,617, Aug. 8, 1983, abandoned.

[51] Int. Cl.$^4$ ............................................. A23K 1/00
[52] U.S. Cl. ....................................... 426/1; 426/643; 426/646
[58] Field of Search ................. 426/1, 2, 643, 646, 426/807

[56] References Cited

U.S. PATENT DOCUMENTS 2,874,048 2/1959 Walldov .................................. 426/1
4,463,018 7/1984 Carr ........................................ 426/1

OTHER PUBLICATIONS

Fishery Leaflet 28, U.S. Dept. Of The Interior, Fish and Wildlife Service, Sep. 1948, p. 17.

*Primary Examiner*—R. B. Penland
*Attorney, Agent, or Firm*—Olson & Olson

[57] ABSTRACT

An artificially extended natural seafood bait is produced by dissolving gelatin or pectin or combinations thereof in water at a temperature elevated only sufficiently to liquify the material. Into this liquified material there is dispersed a quantity of natural fish or seafood ground to a particle size of not more than about ⅛ inch. Also contained within the liquified material is a mat of randomly crossed fibers of a fibrous material, preferably garnetted cotton. The foregoing fluid mass is allowed to cool to a temperature sufficient to solidify it, after which the solidified, fiber-reinforced artificially extended natural bait is cut to desired bait size pieces. In a preferred method of manufacture, a quantity of the ground fish or seafood is distributed over the surface of a container, a layer of the fibrous mat is placed over the ground material and a second quantity of the ground material is distributed over the fibrous mat. The liquified gelatin and/or pectin then is poured over the assembled materials in the container to penetrate the mass, after which the fluid mass is cooled to solidify it and thereafter cut to desired bait size pieces.

5 Claims, No Drawings

ARTIFICIALLY EXTENDED NATURAL SEAFOOD BAIT AND METHOD OF MAKING THE SAME

CROSS-REFERENCE TO RELATED APPLICATION

This is a continuation-in-part of our abandoned earlier application, Ser. No. 852,083 filed Apr. 14, 1986 as a continuation of abandoned application, Ser. No. 707,421 filed Mar. 1, 1985 as a continuation-in-part of abandoned parent application, Ser. No. 521,617 filed Aug. 8, 1983.

BACKGROUND OF THE INVENTION

This invention relates to fish and crab bait, and more particularly to an artificially extended natural seafood bait characterized by increased resistance to water and mechanical wear and by extending the natural seafood bait by a factor of at least six.

Natural bait, such as raw herring of usable quality, is expensive and often unavailable when needed in large quantities by commercial fishermen.

Artificial fish and crab baits, including those incorporating reconstituted protein or gelatin as bases, have been provided heretofore. They also have incorporated artificial scents for attracting the seafoods. However, such baits have exhibited poor resistance to long-term water exposure and have had insufficient mechanical integrity to resist mechanical wear and tear and removal by fish, crab and other seafoods.

On the other hand, an artificial bait of the type disclosed in U.S. Pat. No. 2,874,048 utilizes a shaped fabric strip to carry on its opposite sides water soluble laminations of gelatin in which is disbursed such additives as color dyes, flavorings, bone meal and baking powder. In use, the fabric strip is impaled on a fish hook and the laminations are caused to be released in the waters being fished.

However, it has been found that such fabric-reinforced baits, such as the sports fishermen's bait known as Gator Bait, are not only difficult to remove from a hook by hand, but more importantly they are incapable of being used by commercial fisherman who employ automatic hook baiting and hook cleaning equipment. In this latter regard, a typical commercial fishing line of 1500 feet and mounting hooks at two foot intervals, is passed at relatively high speed longitudinally through automatic hook baiting equipment by which it is intended that each hook snag a bait (usually a cut piece of fresh herring) as the line is delivered into the waters being fished. After the catch phase is completed, the line is passed rapidly between the opposed brushes of hook cleaning equipment as the line is drawn in from the waters, for removing the bait from those hooks which did not catch fish.

It has been found that a greater percentage of fabric-reinforced baits of the type previously discussed fail to become snagged by hooks during the automatic commercial hook baiting process than do fresh herring or other fresh seafood baits. Of greater significance is the observation that such fabric-reinforced baits fail to become removed from the hooks as they pass through the brushes of commercial hook cleaning equipment.

SUMMARY OF THE INVENTION

In its basic concept, this invention provides an artificially extended seafood bait in which gelatin and/or pectin, in admixture with ground fish or seafood, is incorporated in and reinforced by a mat of randomly crossed fibers of fibrous material.

It is by virtue of the foregoing basic concept that the principal objective of this invention is achieved; namely, the provision of an artificially extended seafood bait which overcomes the disadvantages and limitations of prior seafood baits.

Another objective of this invention is the provision of a simplified and economical method of manufacturing a seafood bait of the class described on a large scale for use by commercial fishing operations.

A further objective of this invention is the provision of an artificially extended seafood bait that is admirably suited for commercial fishing operations since it readily and efficiently accommodates use of automatic commercial hook baiting and hook cleaning equipment.

Still another objective of this invention is the provision of a seafood bait in which a natural bait, such as herring, is extended by artificial means to provide over six times the number of pieces of bait as is available only from the natural bait.

The foregoing and other objects and advantages of this invention will appear from the following detailed description of a preferred embodiment.

DESCRIPTION OF THE PREFERRED EMBODIMENT

In general, the artificially extended seafood bait of this invention comprises a gelatin or pectin, or combinations thereof, admixed with ground fish or seafood and reinforced structurally by a mat of randomly crossed fibers of fibrous material, and reduced to a size suitable as pieces of seafood bait.

Gelatin may be used as commercially available, in any bloom stiffness throughout the commercial range, for example 45–300. The gelatin may be of animal or vegetable derivation.

Any of the commercially available pectins may be employed, either alone or in any desired combination with gelatin.

The ground fish or seafood may be selected from any of the natural fishes and seafoods, such as shrimp, herring, clam and others. Preferably, fresh fish or seafood is ground to a size not substantially larger than about 1/8 inch and is incorporated into liquified gelatin and/or pectin before solidification. This combination of ground natural bait and gelatin and/or pectin effectively extends the natural bait. For example, whereas a single herring may be cut up to provide three baits of usable size, that same herring when ground and incorporated with gelatin and/or pectin provides about twenty similarly sized baits.

Visible attractants may be provided from a variety of color pigments, preferably fluorescent, commercially available in any variety of colors such as orange, blue, red, yellow and others.

Anti-mold compounds also may be incorporated in the bait. They include sodium proprionate, ascorbic acid, potassium sorbate, the citrus fruit juices, and others.

Attractant scents also may be added to the mixture. These may include natural or artificial scents of seafoods, such as shrimp, herring, clam and others. A variety of amino acids of suitable scents also may be used.

The fibrous mat is a mass of randomly crossed, relatively short discreet fibers, as distinguished from long interwoven filaments forming cheese cloth or other woven fabric, and may be formed of any of a wide variety of synthetic and natural filament materials. These include a variety of synthetic resins such as polyester and polyamide resins, as well as natural fibers such as cotton, wood and other cellulosic materials. Commercially available garnetted cotton is a preferred fibrous material because of its availability in large quantities at very low cost. Moreover, it is biodegradable and thus presents no hazard to the environment.

The fibrous mat may be provided in any density capable of forming a dispersion of loosely matted fibers throughout the volume of liquid component which includes the heated mixture of gelatin and/or pectin and, if desired, attractant scent, visible attractant and anti-mold material. It has been found, for example, that a mat density ranging from 1-5 ounces per square yard is quite suitable for the purpose of this invention.

The thickness of the mat may be selected in accordance with the thickness of the bait, so that fibers of the mat are dispersed throughout the volume of the bait and thus are readily available for snagging by a fish hook during automatic commercial hook baiting. For example, if a finished bait is to be one inch thick, the fiber mat may be chosen to be about ¾ inch thick; the bait is to be ½ inch thick, the fiber mat chosen may be about ⅜ inch thick; and so on.

However, it has been found that a thin layer of a mat of randomly crossed fibers of garnetted cotton may be incorporated in the central portion of the gelatin/pectin and fresh ground seafood mixture to provide a very effective commercial bait. For example, a mat layer of about ⅛ inch thickness incorporated in the central portion of a bait having a thickness of about ⅝ inch, is readily hooked by automatic baiting equipment and readily removed from fish hooks by automatic hook cleaning equipment.

The bait of this invention is formed by dissolving gelatin and/or pectin in water at a minimum elevated temperature sufficient to effect solubilization. Visible attractant, attractant scent and anti-mold compound also may be added to the liquid if desired. Various procedures then may be utilized to incorporate into the liquid a quantity of ground fish or seafood and the mat of randomly crossed fibers. Thereafter the fluid mixture is cooled sufficiently to solidify the liquid, after which the solidified, mat-reinforced bait is cut into desired bait size pieces.

In one method of manufacture, the gelatin and/or pectin is added to water, along with visible pigment, anti-mold compound and/or attractant scent, as desired, and the mixture heated until the gelatin and/or pectin is dissolved. This solution is cooled to below about 140° F., if it had been heated to a higher temperature, and the ground fish or seafood is mixed in. The mixture then is poured into a tray and a layer of the aforementioned fibrous mat material is placed upon the liquid. More of the liquid mixture then is poured over the mat so that ground fish or seafood is contained in the liquid on both sides of the mat. The mat-containing solution is allowed to cool to room temperature or lower and the resulting solidified mass is then stripped from the tray and cut to appropriate bait size pieces.

In another method of manufacture, the liquified gelatin and/or pectin is poured into a tray, ground fresh fish or seafood is deposited in the liquid and the layer of fibrous mat is placed upon the mixture of liquid and fresh ground fish or seafood. Another layer of liquified gelatin and/or pectin is poured over the mat layer and more ground fresh fish or seafood is deposited on the liquid. The ground fish or seafood is caused to settle into the liquid. This assembly then is solidified and cut to bait size pieces.

In the preferred method of manufacture, a layer of ground fresh fish or seafood is distributed over the bottom of a shallow tray and a quantity of the liquid gelatin and/or pectin is poured over the ground material. A layer of the aforementioned fibrous mat then is placed upon the liquid in the tray and a further quantity of fresh ground fish or seafood is distributed over the mat layer. Another quantity of the liquified gelatin and/or pectin then is poured over the distributed ground material. This liquid penetrates the layer of ground fish or seafood and the fibrous mat layer to join with the liquid layer first deposited in the tray. The resulting integral fluid mass is then cooled to solidify the gelatin and/or pectin, after which it is cut to desired bait size pieces.

The following examples are illustrative of the invention:

EXAMPLE I

To 5 cups of water was added 70 grams of 300 bloom gelatin and ⅛ teaspoon of blue pigment. The mixture was heated to 96° F. and 4 drops of an aqueous solution of one gram per litre of strombine hydrochloride was added. Into a 10 inch by 15 inch tray was placed a layer of 5 ounces of frozen ground herring. Over this layer was placed a batting of 3 ounce polyester resin fiber, 10 inches by 15 inches by ½ inch thick. Five more ounces of frozen ground herring was dispersed uniformly over the batting. The heated solution then was poured into the tray, covering the layers of ground herring and the interposed layer of batting. The resulting layered assembly included about ¼ inch layer of compressed batting between about ⅛ inch layers of ground herring, all dispersed in the liquified solution. The assembly was allowed to cool to ambient temperature to solidify it, after which it was removed from the tray and cut into about 100 uniform size bait pieces.

It is to be noted that the 10 ounces of frozen ground herring was derived from a number of whole herrings which, if cut to the same size bait pieces as the above assembly, would provide no more than 18 baits. Accordingly, the assembly effectively extends the natural herring bait about six fold.

The bait produced as described in Example I utilizes the fibrous mat to prevent premature disintegration of the bait piece, and utilizes the ground fresh fish or seafood to produce a chumming effect, i.e. the sluffing off of particles of fresh fish or seafood into the waters being fished to attract fish to the baited hooks.

EXAMPLE II

A commercial size batch of bait was made by grinding 25 pounds of herring to a particle size not exceeding about ⅛ inch. Half of the ground herring was spread over a number of shallow trays. This provided a layer of about ¼ inch in thickness. Over this layer was placed a mat of randomly crossed fibers of garnetted cotton about ⅛ inch thick. The remaining half of the ground herring was then spread over the fibrous mat. A gelatin solution was made of about 8 gallons of water, about 4.75 pounds of 300 bloom gelatin, about 2 tablespoons of blue dye concentrate, about 1 tablespoon of synthetic clam flavor and about 1 tablespoon of strombine hydrochloride. This solution mixture was heated to about 96°

F. to liquify it, and the solution was then poured over the assembly of ground herring and fibrous mat in the trays. The solution penetrated the entire mass, producing a fluid mass about ⅜ inch thick.

The fluid mass was then cooled to solidify the gelatin, and the gelled mass then was removed from each tray and cut to bait size pieces measuring 1.25 inch by 1.25 inch by ⅜ inch thick. The number of such bait size pieces totaled 3,000. In contrast, when 25 pounds of fresh, unground herring was cut to similar size bait pieces, it produced only 520 such baits. Accordingly, the present invention effectively extended the natural, fresh herring approximately six fold.

Moreover, the pieces of bait produced by Example II were found to be applied to commercial fish line hooks very effeciently by conventional commercial automatic hook baiting equipment. Additionally, fragments and whole pieces of the bait that did not catch fish and remained on the fish hooks, were readily removed from the hooks by operation of conventional commercial automatic hook cleaning equipment.

Still further, the artificially extended herring bait performed as effectively as pure natural herring bait in its ability to catch fish on a commercial scale.

It has been found that the herring utilized in the foregoing Examples may be replaced with a like quantity of other ground fresh fish or seafood, such as pilchard, mullet, squid, clam, etc.

It has been found that the fiber-mat-reinforced baits of this invention exhibit high resistance to long term water exposure. They also provide good resistance to mechanical wear and tear, and resist easy removal of the bait by fish or crabs. On the other hand, they are readily snagged by fish hooks during automatic commercial baiting at high speed, and they are readily removed by automatic commercial hook cleaning equipment, preparatory to re-baiting.

It will be apparent to those skilled in the art that various changes may be made in the types of materials and their relative proportions and in the method steps of formulation described hereinbefore, without departing from the spirit of this invention and the scope of the appended claims.

We claim:

1. A method of making an artificially extended natural seafood bait for automatic hook baiting and hook cleaning, comprising dispersing throughout a liquified quantity of one or both of the natural bait extending materials gelatin and pectin, a quantity of natural solid fish or seafood bait ground to a particle size of not more than about ⅛ inch thick, and a mat of randomly crossed fibers of a fibrous material, and thereafter solidifying the liquid to form a fiber-reinforced artificially extended natural bait suitable for automatic hook baiting and hook cleaning.

2. The method of claim 1 wherein a quantity of the ground natural fish or seafood bait is distributed over the bottom of a container, the mat of randomly crossed fibers of a fibrous material is placed over the distributed ground material, an additional quantity of this ground bait material is distributed over the fibrous mat, and the liquified quantity of gelatin and/or pectin is poured over the assembly of bait and fiber to form a fluid mass thereof, thereafter cooling the fluid mass to solidify it, and thereafter removing the solidified mass from the container and cutting the mass to produce a plurality of bait size pieces.

3. An artificially extended natural seafood bait, consisting essentially of one or both of the natural bait extending materials gelatin and pectin having dispersed throughout its volume a quantity of natural solid fish or seafood ground to a particle size of not more than about ⅛ inch and containing therein a mat of randomly crossed fibers of a fibrous material to produce a bait for automatic hook baiting and hook cleaning.

4. The artificially extended natural seafood bait of claim 3 wherein the mat is formed of garnetted cotton.

5. The artificially extended natural seafood bait of claim 3 wherein the ground natural fish or seafood is herring.

* * * * *